US011586863B2

(12) United States Patent
Jia et al.

(10) Patent No.: US 11,586,863 B2
(45) Date of Patent: Feb. 21, 2023

(54) IMAGE CLASSIFICATION METHOD AND DEVICE

(71) Applicant: SHENZHEN UNIVERSITY, Shenzhen (CN)

(72) Inventors: Sen Jia, Shenzhen (CN); Bin Deng, Shenzhen (CN); Jiasong Zhu, Shenzhen (CN); Lin Deng, Shenzhen (CN); Qingquan Li, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 33 days.

(21) Appl. No.: 17/209,120

(22) Filed: Mar. 22, 2021

(65) Prior Publication Data

US 2021/0209426 A1    Jul. 8, 2021

Related U.S. Application Data

(63) Continuation of application No. PCT/CN2018/110916, filed on Oct. 19, 2018.

(30) Foreign Application Priority Data

Sep. 29, 2018  (CN) .......................... 201811146961.8

(51) Int. Cl.
*G06K 9/62* (2022.01)
*G06V 10/26* (2022.01)

(52) U.S. Cl.
CPC ......... *G06K 9/6277* (2013.01); *G06K 9/6217* (2013.01); *G06K 9/6292* (2013.01); *G06V 10/267* (2022.01)

(58) Field of Classification Search
None
See application file for complete search history.

(56) References Cited

U.S. PATENT DOCUMENTS

| 10,635,927 B2 * | 4/2020 | Chen .................... G06N 3/0454 |
| 2008/0008372 A1 * | 1/2008 | Li .......................... G06T 11/006 382/131 |
| 2013/0129256 A1 * | 5/2013 | Robinson .................. G06T 9/00 382/298 |
| 2018/0253622 A1 * | 9/2018 | Chen ...................... G06V 10/82 |
| 2020/0372648 A1 * | 11/2020 | Zhang .................... G06V 10/82 |

OTHER PUBLICATIONS

S. Li, T. Lu, L. Fang, X. Jia and J. A. Benediktsson, "Probabilistic Fusion of Pixel-Level and Superpixel-Level Hyperspectral Image Classification," in IEEE Transactions on Geoscience and Remote Sensing, vol. 54, No. 12, pp. 7416-7430, Dec. 2016, doi: 10.1109/TGRS.2016.2603190. (Year: 2016).*

* cited by examiner

*Primary Examiner* — Tahmina N Ansari
(74) *Attorney, Agent, or Firm* — Troutman Pepper Hamilton Sanders LLP

(57) ABSTRACT

Provided are an image fusion classification method and device. The method includes that: a three-dimensional weight matrix of a hyperspectral image is obtained by use of a Support Vector Machine (SVM) classifier (101); superpixel segmentation is performed on the hyperspectral image to obtain K superpixel images, K being a positive integer (102); the three-dimensional weight matrix is regularized by use of a superpixel-image-based segmentation method to obtain a regular matrix (103); and a class that a sample belongs to is determined according to the regular matrix (104).

12 Claims, 4 Drawing Sheets

IMAGE CLASSIFICATION METHOD AND DEVICE

CROSS-REFERENCE TO RELATED APPLICATION(S)

This application is a continuation of International Application No. PCT/CN2018/110916, filed on Oct. 19, 2018, which claims priority to Chinese Patent Application No. 201811146961.8, filed on Sep. 29, 2018, the entire disclosures of which are hereby incorporated by reference.

TECHNICAL FIELD

The disclosure relates to the field of computers, and particularly to an image fusion classification method and device.

BACKGROUND

With the progress of image segmentation technologies in the field of computer vision, superpixel extraction may provide a spatial homogenized representation of an observed object, thereby providing important ground object information description means for hyperspectral image analysis.

Specifically, a superpixel refers to a homogenized region including multiple pixels. Since a ground object distribution usually has a certain regularity, a relationship between neighbor pixels of a superpixel-segmentation-based hyperspectral image may be mined better. At present, methods for using a superpixel for hyperspectral image classification are mainly divided into two major types: preprocessing and post processing. In preprocessing, a spatial-spectral feature is mainly obtained by use of superpixel information, thereby further guiding subsequent classification. In post processing, a superpixel-segmentation-based image is mainly adopted to fuse classification results as aided decision means. However, all existing superpixel-based methods have a severe shortcoming that the number of extracted superpixels is unlikely to estimate accurately.

SUMMARY

A first aspect of the disclosure discloses an intelligent image fusion classification method, which includes that:

a three-dimensional weight matrix of a hyperspectral image is obtained by use of a Support Vector Machine (SVM) classifier;

superpixel segmentation is performed on the hyperspectral image to obtain K superpixel images, K being a positive integer;

the three-dimensional weight matrix is regularized by use of a superpixel-image-based segmentation method to obtain a regular matrix; and a class that a sample belongs to is determined according to the regular matrix.

A second aspect of the disclosure discloses an image fusion classification device. The image fusion classification device includes at least one processor and a memory. The memory is coupled to the at least one processor and stores at least one computer executable instruction thereon which, when executed by the at least one processor, causes the at least one processor to execute the method of the first aspect.

A third aspect of the disclosure discloses a non-transitory computer-readable storage medium. The non-transitory computer readable storage medium is configured to store a computer program which, when executed by a processor, causes the processor to execute the method of the first aspect.

BRIEF DESCRIPTION OF THE DRAWINGS

In order to describe the technical solutions in the embodiments of the disclosure more clearly, the drawings required to be used in the embodiments will be simply introduced below. It is apparent that the drawings described below are some embodiments of the disclosure. Those of ordinary skill in the art may further obtain other drawings according to these drawings without creative work.

DETAILED DESCRIPTION

The embodiments of the disclosure provide an image fusion classification method and device. The method includes that: a three-dimensional weight matrix of a hyperspectral image is obtained by use of an SVM classifier; superpixel segmentation is performed on the hyperspectral image to obtain K superpixel images, K being a positive integer; the three-dimensional weight matrix is regularized by use of a superpixel-image-based segmentation method to obtain a regular matrix; and a class that a sample belongs to is determined according to the regular matrix. Through the method provided in the disclosure, problems about estimation of the number of superpixels may be solved. Furthermore, spatial structure information of ground objects in different superpixel images is fused in a cascading manner, so that the feature identification capability is improved remarkably.

In order to make those skilled in the art understand the solutions of the disclosure better, the technical solutions in the embodiments of the disclosure will be clearly described below in combination with the drawings in the embodiments of the disclosure. It is apparent that the described embodiments are not all embodiments but a part of the embodiments of the disclosure. All other embodiments obtained by those of ordinary skill in the art based on the embodiments in the disclosure without creative work shall fall within the scope of protection of the disclosure.

Terms "first", "second", "third" and the like appearing in the specification, claims and drawings of the disclosure are adopted not to describe a specific sequence but to distinguish different objects. In addition, terms "include" and "have" and any transformation thereof are intended to cover non-exclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

First of all, it is to be pointed out that the disclosure relates to an SRCF technology and system. Since hyperspectral remote sensing images formed by a hyperspectral sensor in hundreds of wave bands include rich radiation, spatial and spectral information of a ground object, the ground object may be recognized and classified more effectively. For improving the classification accuracy of the hyperspectral remote sensing image, a spatial distribution feature and spectral feature of the ground object may be fused and then the ground object is classified.

Figure 1:
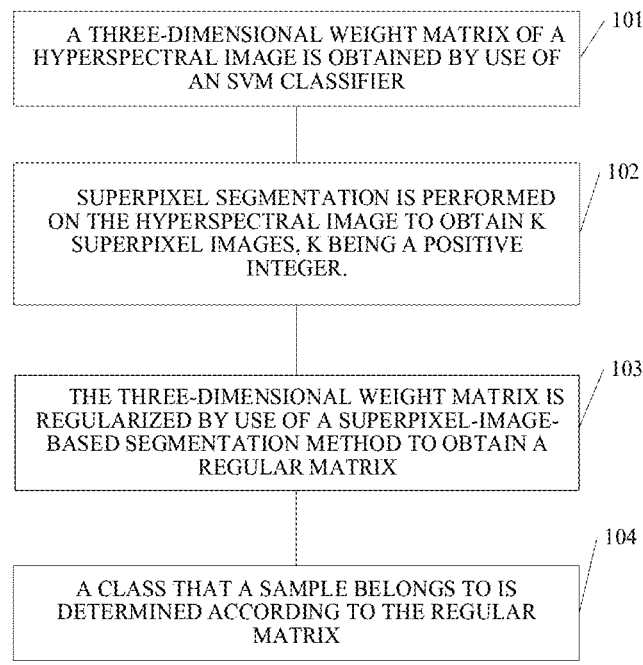
FIG. 1 is a flowchart of an image fusion classification method according to an embodiment of the disclosure.

Referring to FIG. 1, FIG. 1 is a flowchart of an image fusion classification method according to an embodiment of the disclosure. As shown in FIG. 1, the image fusion classification method provided in the embodiment of the disclosure includes the following contents.

In 101, a three-dimensional weight matrix of a hyperspectral image is obtained by use of an SVM classifier.

It is to be pointed out that the SVM classifier is proposed for binary classification problems and is successfully applied to solving of function regression and one-class classification problems. At present, common methods include the following three. (1) A one-to-many method: the idea thereof is that it is determined that samples of a certain class belong to a class and samples of other classes belong to another class to turn classification into a binary classification problem and then the step is repeated for the other samples. (2) A one-to-one method: in multi-class classification, samples of only two classes are considered at a time, namely an SVM model is designed for samples of every two classes, so that totally $k(k-1)2$ SVM models are required to be designed. (3) An SVM decision tree method: it is usually combined with a binary decision tree to form a multi-class recognizer for recognition.

In addition, it is to be further pointed out that a hyperspectral image is acquired by an imaging spectrometer and the imaging spectrometer provides tens to hundreds of pieces of narrow-band spectral information for each image element and generates a complete and continuous spectral curve. Therefore, a matter that is originally undetectable in broadband remote sensing is detectable in a hyper-spectrum.

Hyperspectral data may be represented as a hyperspectral data cube and is a three-dimensional data structure. The hyperspectral data may be considered as a three-dimensional image, and one-dimensional spectral information is added to an ordinary two-dimensional image. A spatial image thereof describes a two-dimensional spatial feature of the earth surface, and a spectral dimension thereof reveals a spectral curve feature of each image element of the image. Therefore, organic fusion of a remote sensing data image dimension and the information of the spectral dimension is implemented.

It is to be pointed out that the operation that the three-dimensional weight matrix of the hyperspectral image is obtained by use of the SVM classifier includes:

Step 21: model training is performed on a training sample set A by use of an SVM method to obtain a probability output model Model;

Step 22: class probability output is performed on any test sample g by use of the probability output model Model to obtain a weight probability that g belongs to each class; and Step 23: Step 22 is repeated for all samples in the hyperspectral image to obtain the three-dimensional weight matrix of all the samples in the hyperspectral image.

For example, there is made such a hypothesis that the hyperspectral image is $H \in i^{X,Y,Z}$, where i represents a real number, and X, Y and Z represent the numbers of the spatial dimension and spectral dimension of the hyperspectral image respectively. It is set that $A \in i^{Z,n}$ represents n samples in the training set and there are totally C ground object classes in the image. In such case, for any test sample $g \in i^{Z,1}$, a classification process is as follows.

1) Model training is performed on the training sample set A by use of the probability output SVM method to obtain the probability output model Model.

2) Class probability output is performed on any test sample g by use of the model Model to obtain the weight probability that g belongs to each class.

3) Step 2) is repeated for all the samples in the hyperspectral image to obtain the three-dimensional weight matrix of all the samples, recorded as $\{P_c, c=1, 2, \ldots, C\}$.

In 102, superpixel segmentation is performed on the hyperspectral image to obtain K superpixel images, K being a positive integer.

It is to be pointed out that the operation that superpixel segmentation is performed on the hyperspectral image to obtain the K superpixel images includes that: superpixel segmentation is performed on the hyperspectral image by use of an ERS method to obtain the K superpixel images.

Furthermore, it is to be pointed out that common superpixel segmentation methods also include TurboPixel, SLIC, NCut, Graph-based, Watershed (Marker-based Watershed), Meanshift and the like.

In 103, the three-dimensional weight matrix is regularized by use of a superpixel-image-based segmentation method to obtain a regular matrix.

It is to be pointed out that the operation that the three-dimensional weight matrix is regularized by use of the superpixel-image-based segmentation method to obtain the regular matrix includes: Step 41: each superpixel $S_k$ is judged, if $S_k$ only includes a sample belonging to a class c in the training sample set A, it is determined that, in a vector $u \in i^{c \times 1}$, $u_c=1$ and all the other elements are 0 and each column vector in $U_k$ is set to be equal to u, otherwise an average value of $U_k$ for each row is calculated to obtain the vector u, the vector u is divided by the number of pixels in the superpixel and each column vector in $U_k$ is further set to be equal to u; and Step 42: after Step 41 is executed for all superpixels, the regular matrix U is obtained.

For example, after the hyperspectral image is segmented by use of the ERS method, a segmented image $\{S_k, k=1, 2, \ldots, K\}$ with K superpixels may be obtained. In addition, all elements in the regular matrix $U \in i^{X,Y,C}$ are initialized to be 0. Moreover, a classification matrix $Z \in i^{X,Y,C}$ may also be initialized to set all elements in the classification matrix to be 0. For each superpixel $S_k$, $U_k$ represents weight information corresponding to the kth superpixel.

In such case, the superpixel $S_k$ is judged as follows.

(1) If $S_k$ only includes a sample belonging to the class c in the training sample set A, it is determined that, in the vector $u \in i^{c,1}$, $u=1$ and all the other elements are 0, and each column vector in $U_k$ is set to be equal to u.

(2) Otherwise, the average value of $U_k$ for each row is calculated to obtain the vector u, the vector u is divided by the number of the pixels in the superpixel, and each column vector in $U_k$ is further set to be equal to u.

(3) After Step 2) is executed on all the superpixels, the regular matrix U is obtained, and furthermore, the regular matrix is fused to the classification matrix Z, namely $Z=Z+U$.

In 104, a class that a sample belongs to is determined according to the regular matrix.

It is to be pointed out that the operation that the class that the sample belongs to is determined according to the regular matrix includes that: the regular matrix is fused to a classification matrix; and a maximum value corresponding to each sample in the classification matrix is determined as a class that the sample belongs to.

For example, a value of the number K of the superpixels may be reduced according to a step length p=50, namely K=K−p, and each step in Step 3 is repeated until the number K of the superpixels reaches 50. When the number K of the superpixels reaches 50, a final classification result may be obtained. The calculated classification matrix Z may be observed, and for each sample, the class corresponding to the maximum value is a predicted class.

It can be seen that the image fusion classification method and device are disclosed in the solutions of the embodiments. The method includes that: the three-dimensional weight matrix of the hyperspectral image is obtained by use of the SVM classifier; superpixel segmentation is performed on the hyperspectral image to obtain the K superpixel images, K being a positive integer; the three-dimensional weight matrix is regularized by use of the superpixel-image-based segmentation method to obtain the regular matrix; and the class that the sample belongs to is determined according to the regular matrix. Through the method provided in the disclosure, problems about estimation of the number of superpixels may be solved. Furthermore, spatial structure information of ground objects in different superpixel images is fused in a cascading manner, so that the feature identification capability is improved remarkably.

Figure 2:
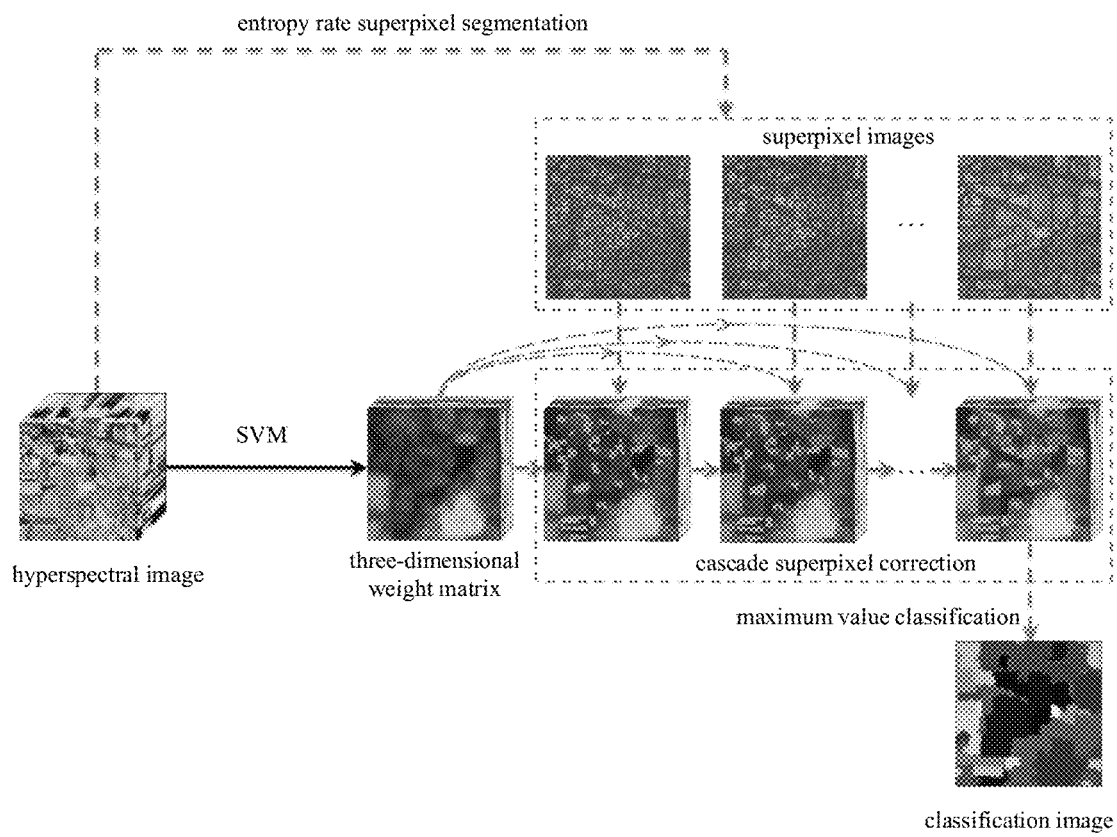
FIG. 2 is another schematic diagram of image fusion classification according to an embodiment of the disclosure.
Figure 3:
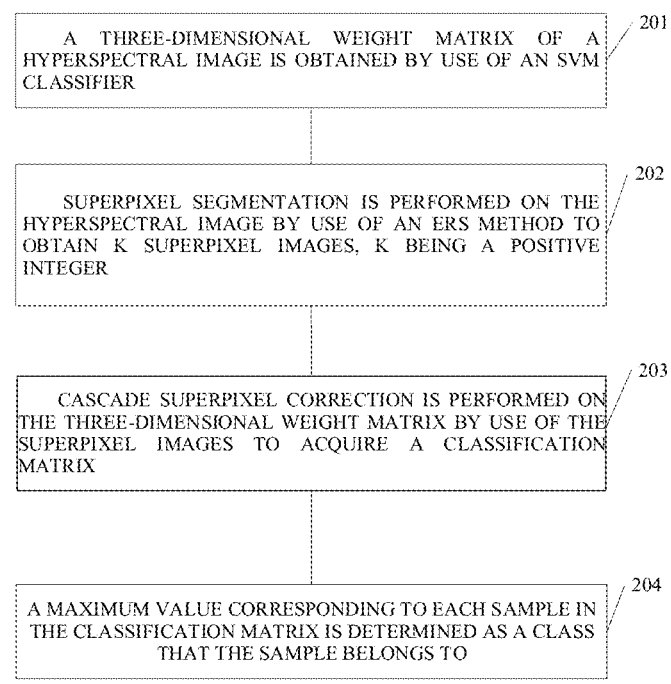
FIG. 3 is a flowchart of another image fusion classification method according to an embodiment of the disclosure.

FIG. 2 in the disclosure shows a schematic diagram of SRCF. A specific flow is shown in FIG. 3. The method includes the following steps.

In 201, a three-dimensional weight matrix of a hyperspectral image is obtained by use of an SVM classifier.

In 202, superpixel segmentation is performed on the hyperspectral image by use of an ERS method to obtain K superpixel images, K being a positive integer.

In 203, cascade superpixel correction is performed on the three-dimensional weight matrix by use of the superpixel images to acquire a classification matrix.

In 204, a maximum value corresponding to each sample in the classification matrix is determined as a class that the sample belongs to.

It is to be pointed out that explanations about the related steps of the method shown in FIG. 3 may refer to the embodiment corresponding to FIG. 1.

Figure 4:
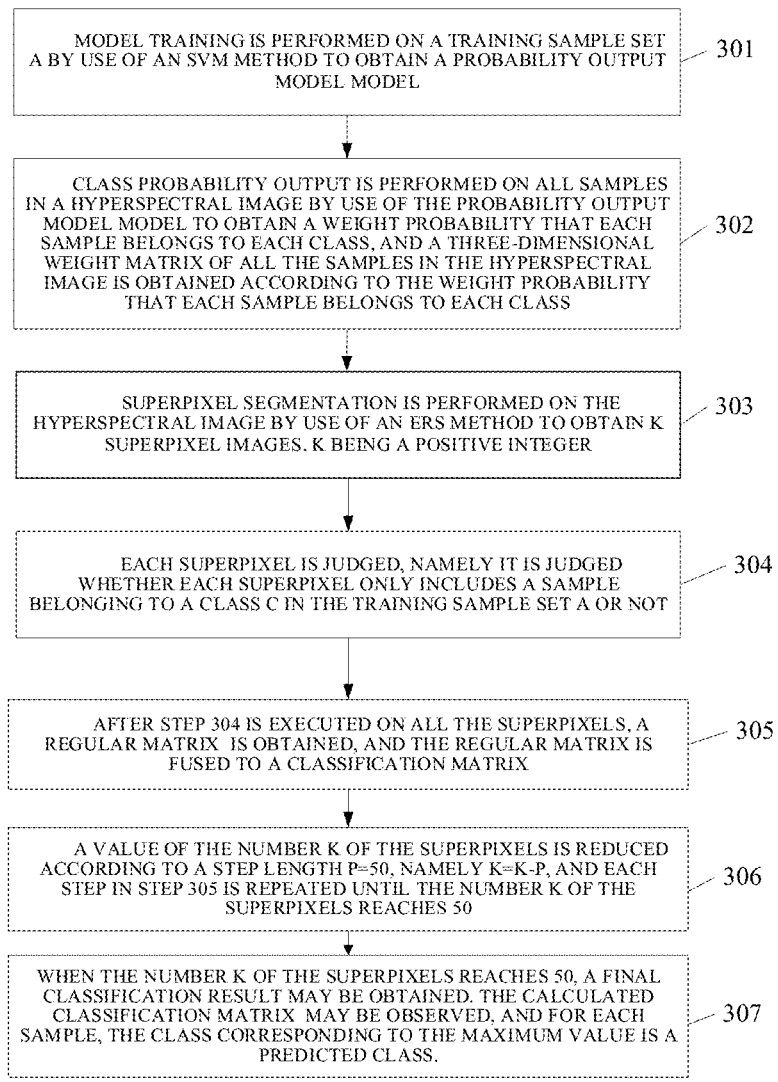
FIG. 4 is a flowchart of another image fusion classification method according to an embodiment of the disclosure.

Referring to FIG. 4, FIG. 4 is a flowchart of another image fusion classification method according to another embodiment of the disclosure. As shown in FIG. 4, the other image fusion classification method provided in the other embodiment of the disclosure may include the following contents.

In 301, model training is performed on a training sample set A by use of an SVM method to obtain a probability output model Model.

In 302, class probability output is performed on all samples in a hyperspectral image by use of the probability output model Model to obtain a weight probability that each sample belongs to each class, and a three-dimensional weight matrix of all the samples in the hyperspectral image is obtained according to the weight probability that each sample belongs to each class.

In 303, superpixel segmentation is performed on the hyperspectral image by use of an ERS method to obtain K superpixel images, K being a positive integer.

In 304, each superpixel is judged, namely it is judged whether each superpixel only includes a sample belonging to a class c in the training sample set A or not;

if the superpixel $S_k$ only includes the sample belonging to the class c in the training sample set A, it is determined that, it is determined that, in a vector $u \in i^{c,1}$, $u_c=1$ and all the other elements are 0 and each column vector in $U_k$ is set to be equal to u, otherwise an average value of $U_k$ for each row is calculated to obtain the vector u, the vector u is divided by the number of the pixels in the superpixel, and each column vector in $U_k$ is further set to be equal to u.

In 305, after Step 304 is executed on all the superpixels, a regular matrix U is obtained, and the regular matrix is fused to a classification matrix Z, namely Z=Z+U.

In 306, a value of the number K of the superpixels is reduced according to a step length p=50, namely K=K−p, and each step in Step 305 is repeated until the number K of the superpixels reaches 50.

X may be equal to 40 or 50 or 60. Herein, enumerations are omitted and no limits are made.

In 307, when the number K of the superpixels reaches 50, a final classification result may be obtained. The calculated classification matrix Z may be observed, and for each sample, the class corresponding to the maximum value is a predicted class.

It can be seen that, in the solution of the embodiment, through the method provided in the disclosure, problems about estimation of the number of superpixels may be solved. Furthermore, spatial structure information of ground objects in different superpixel images is fused in a cascading manner, so that the feature identification capability is improved remarkably.

Figure 5:
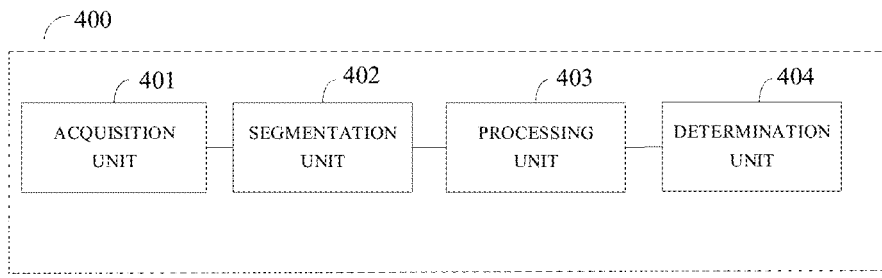
FIG. 5 is a structure diagram of an image fusion classification device according to an embodiment of the disclosure.

Referring to FIG. 5, FIG. 5 is a structure diagram of an image fusion classification device according to an embodiment of the disclosure. FIG. 5 shows the image fusion classification device 400 provided in the embodiment of the disclosure. The device 400 includes an acquisition unit 401, a segmentation unit 402, a processing unit 403 and a determination unit 404.

The acquisition unit 401 is configured to obtain a three-dimensional weight matrix of a hyperspectral image by use of an SVM classifier.

The segmentation unit 402 is configured to perform superpixel segmentation on the hyperspectral image to obtain K superpixel images, K being a positive integer.

The processing unit 403 is configured to regularize the three-dimensional weight matrix by use of a superpixel-image-based segmentation method to obtain a regular matrix.

The determination unit 404 is configured to determine a class that a sample belongs to according to the regular matrix.

The acquisition unit 401 is configured to execute Steps 21 to 23: Step 21: model training is performed on a training sample set A by use of an SVM method to obtain a probability output model Model; Step 22: class probability output is performed on any test sample g by use of the probability output model Model to obtain a weight probability that g belongs to each class; and Step 23: Step 22 is repeated for all samples in the hyperspectral image to obtain the three-dimensional weight matrix of all the samples in the hyperspectral image.

The segmentation unit 402 is configured to perform superpixel segmentation on the hyperspectral image by use of an ERS method to obtain the K superpixel images.

The processing unit 403 is configured to execute Steps 41 to 42: Step 41: each superpixel $S_k$ is judged, if $S_k$ only includes a sample belonging to a class c in the training sample set A, it is determined that, in a vector $u \in i^{c,1}$, $u_c=1$ and all the other elements are 0 and each column vector in $U_k$ is set to be equal to u, otherwise an average value of $U_k$ for each row is calculated to obtain the vector u, the vector u is divided by the number of pixels in the superpixel and each column vector in $U_k$ is further set to be equal to u; and Step 42: after Step 41 is executed for all superpixels, the regular matrix U is obtained.

The determination unit 404 is configured to fuse the regular matrix to a classification matrix and determine a maximum value corresponding to each sample in the classification matrix as a class that the sample belongs to.

The acquisition unit 401, the segmentation unit 402, the processing unit 403 and the determination unit 404 may be configured to execute the method described in any embodiment, specific descriptions refer to the descriptions about the method in embodiment 1, and elaborations are omitted herein.

Figure 6:
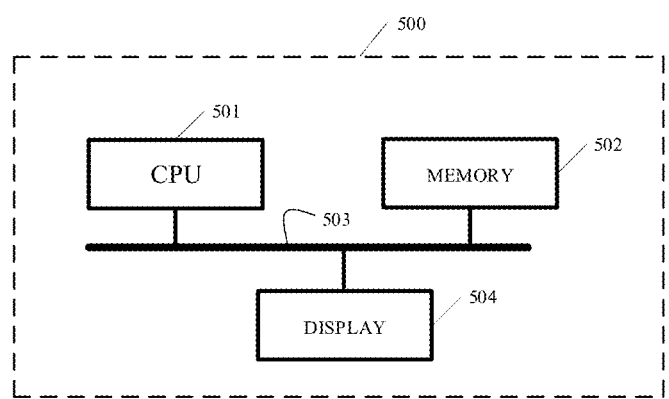
FIG. 6 is a physical structure diagram of another image fusion classification device according to an embodiment of the disclosure.

Referring to FIG. 6, another embodiment of the disclosure provides an image fusion classification device 500. The device 500 includes hardware such as a Central Processing Unit (CPU) 501, a memory 502, a bus 503 and a display 504.

The CPU 501 executes a server program pre-stored in the memory 502. An execution process includes that:

a three-dimensional weight matrix of a hyperspectral image is obtained by use of an SVM classifier;

superpixel segmentation is performed on the hyperspectral image to obtain K superpixel images, K being a positive integer;

the three-dimensional weight matrix is regularized by use of a superpixel-image-based segmentation method to obtain a regular matrix; and a class that a sample belongs to is determined according to the regular matrix.

Optionally, the operation that the three-dimensional weight matrix of the hyperspectral image is obtained by use of the SVM classifier includes:

Step 21: model training is performed on a training sample set A by use of an SVM method to obtain a probability output model Model;

Step 22: class probability output is performed on any test sample g by use of the probability output model Model to obtain a weight probability that g belongs to each class; and Step 23: Step 22 is repeated for all samples in the hyperspectral image to obtain the three-dimensional weight matrix of all the samples in the hyperspectral image.

Optionally, the operation that superpixel segmentation is performed on the hyperspectral image to obtain the K superpixel images includes that:

superpixel segmentation is performed on the hyperspectral image by use of an ERS method to obtain the K superpixel images.

Optionally, the operation that the three-dimensional weight matrix is regularized by use of the superpixel-image-based segmentation method to obtain the regular matrix includes:

Step 41: each superpixel $S_k$ is judged, if $S_k$ only includes a sample belonging to a class c in the training sample set A, it is determined that, in a vector $u \in i^{c,1}$, $u_c=1$ and all the other elements are 0 and each column vector in $U_k$ is set to be equal to u, otherwise an average value of $U_k$ for each row is calculated to obtain the vector u, the vector u is divided by the number of pixels in the superpixel and each column vector in $U_k$ is further set to be equal to u; and Step 42: after Step 41 is executed for all superpixels, the regular matrix U is obtained.

Optionally, the operation that the class that the sample belongs to is determined according to the regular matrix includes that:

the regular matrix is fused to a classification matrix; and a maximum value corresponding to each sample in the classification matrix is determined as a class that the sample belongs to.

Another embodiment of the disclosure discloses a non-transitory computer-readable storage medium, in which a computer program (for example, program code) is stored, wherein the program code is run by a processor to execute the method in the method embodiment.

Another embodiment of the disclosure discloses a computer program product, which includes a program code, wherein the program code is run to execute the method in the method embodiment.

In some embodiments provided in the application, it should be understood that the disclosed device may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not executed. In addition, coupling, direct coupling or communication connection between the displayed or discussed components may be implemented through indirect coupling or communication connection of some interfaces, devices or units, and may be in an electrical form or other forms.

The units described as separate parts may or may not be separate physically, and parts displayed as units may or may not be physical units, that is, they may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

If being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a Read-Only Memory (ROM), a Random Access Memory (RAM), a mobile hard disk, a magnetic disk or an optical disk.

The above embodiments are adopted not to limit but only to describe the technical solutions of the disclosure. Although the disclosure is described with reference to the embodiments in detail, those of ordinary skill in the art should know that the technical solutions recorded in each embodiment may also be modified or part of the technical features therein may be equivalently replaced, and the technical solutions corresponding to these modifications or replacements do not depart from the scope of the technical solutions of each embodiment of the disclosure.

What is claimed is:

1. An intelligent image classification method, comprising:
obtaining a three-dimensional weight matrix of a hyperspectral image by use of a Support Vector Machine (SVM) classifier;
performing superpixel segmentation on the hyperspectral image to obtain K superpixel images, K being a positive integer greater than 1, and the K superpixel images at least comprising an over-segmentation map and an under-segmentation map;
regularizing the three-dimensional weight matrix by use of a superpixel-image-based segmentation method to obtain a regular matrix, the over-segmentation map and the under-segmentation map being used for regularizing the three-dimensional weight matrix; and
determining a class that a sample belongs to according to the regular matrix, wherein obtaining the three-dimensional weight matrix of the hyperspectral image by use of the SVM classifier comprises:
performing model training on a training sample set A by use of an SVM method to obtain a probability output model;
performing class probability output on any test sample g by use of the probability output model to obtain a weight probability that g belongs to each class; and
repeating the performing class probability output for all samples in the hyperspectral image to obtain the three-dimensional weight matrix of all the samples in the hyperspectral image.

2. The method according to claim 1, wherein performing superpixel segmentation on the hyperspectral image to obtain the K superpixel images comprises:
performing superpixel segmentation on the hyperspectral image by use of an Entropy Rate Superpixel Segmentation (ERS) method to obtain the K superpixel images.

3. The method according to claim 1, wherein regularizing the three-dimensional weight matrix by use of the superpixel-image-based segmentation method to obtain the regular matrix comprises:
judging each superpixel $S_k$, if $S_k$ only comprises a sample belonging to a class c in the training sample set A, determining that, in a vector u e, u, =1 and all the other elements are 0 and setting each column vector in $U_k$ to be equal to u, otherwise calculating an average value of $U_k$ for each row to obtain the vector u, dividing the vector u by the number of pixels in the superpixel and further setting each column vector in $U_k$ to be equal to u; and
obtaining the regular matrix U, after the judging, determining and setting, calculating, dividing and further setting are executed for all superpixels.

4. The method according to claim 1, wherein determining the class that the sample belongs to according to the regular matrix comprises:
fusing the regular matrix to a classification matrix; and
determining a maximum value corresponding to each sample in the classification matrix as the class that the sample belongs to.

5. An image classification device, comprising:
at least one processor; and
a memory coupled to the at least one processor and storing at least one computer executable instruction thereon which, when executed by the at least one processor, causes the at least one processor to:
obtain a three-dimensional weight matrix of a hyperspectral image by use of a Support Vector Machine (SVM) classifier;
perform superpixel segmentation on the hyperspectral image to obtain K superpixel images, K being a positive integer greater than 1, and the K superpixel images at least comprising an over-segmentation map and an under-segmentation map;
regularize the three-dimensional weight matrix by use of a superpixel-image-based segmentation method to obtain a regular matrix, the over-segmentation map and the under-segmentation map being used for regularizing the three-dimensional weight matrix; and
determine a class that a sample belongs to according to the regular matrix, wherein the at least one processor configured to obtain the three-dimensional weight matrix of the hyperspectral image by use of the SVM classifier is configured to:
perform model training on a training sample set A by use of an SVM method to obtain a probability output model;
perform class probability output on any test sample g by use of the probability output model to obtain a weight probability that g belongs to each class; and
repeat performing class probability output on any test sample g by use of the probability output model to obtain the weight probability that g belongs to each class for all samples in the hyperspectral image to obtain the three-dimensional weight matrix of all the samples in the hyperspectral image.

6. The device according to claim 5, wherein the at least one processor configured to perform superpixel segmentation on the hyperspectral image to obtain the K superpixel images is configured to:
perform superpixel segmentation on the hyperspectral image by use of an Entropy Rate Superpixel Segmentation (ERS) method to obtain the K superpixel images.

7. The device according to claim 5, wherein the at least one processor configured to regularize the three-dimensional weight matrix by use of the superpixel-image-based segmentation method to obtain the regular matrix is configured to:
judge each superpixel $S_k$, if $S_k$ only comprises a sample belonging to a class c in the training sample set A, determining that, in a vector met⁻·$u_c$=1 and all the other elements are 0 and setting each column vector in $U_k$ to be equal to u, otherwise calculating an average value of $U_k$ for each row to obtain the vector u, dividing the vector u by the number of pixels in the superpixel and further setting each column vector in $U_k$ to be equal to u; and
obtain the regular matrix U.

8. The device according to claim 5, wherein the at least one processor configured to determine the class that the sample belongs to according to the regular matrix is configured to:

fuse the regular matrix to a classification matrix and determine a maximum value corresponding to each sample in the classification matrix as the class that the sample belongs to.

9. A non-transitory computer-readable storage medium storing a computer program for image classification which, when executed by a processor, causes the processor to:

obtain a three-dimensional weight matrix of a hyperspectral image by use of a Support Vector Machine (SVM) classifier;

perform superpixel segmentation on the hyperspectral image to obtain K superpixel images, K being a positive integer greater than 1, and the K superpixel images at least comprising an over-segmentation map and an under-segmentation map;

regularize the three-dimensional weight matrix by use of a superpixel-image-based segmentation method to obtain a regular matrix, the over-segmentation map and the under-segmentation map being used for regularizing the three-dimensional weight matrix; and determine a class that a sample belongs to according to the regular matrix, wherein the computer program executed by the processor to obtain the three-dimensional weight matrix of the hyperspectral image by use of the SVM classifier is executed by the processor to:

perform model training on a training sample set A by use of an SVM method to obtain a probability output model;

perform class probability output on any test sample g by use of the probability output model to obtain a weight probability that g belongs to each class; and repeat performing class probability output on any test sample g by use of the probability output model to obtain the weight probability that g belongs to each class for all samples in the hyperspectral image to obtain the three-dimensional weight matrix of all the samples in the hyperspectral image.

10. The non-transitory computer-readable storage medium of claim 9, wherein the computer program executed by the processor to perform superpixel segmentation on the hyperspectral image to obtain the K superpixel images is executed by the processor to:

perform superpixel segmentation on the hyperspectral image by use of an Entropy Rate Superpixel Segmentation (ERS) method to obtain the K superpixel images.

11. The non-transitory computer-readable storage medium of claim 9, wherein the computer program executed by the processor to regularize the three-dimensional weight matrix by use of the superpixel-image-based segmentation method to obtain the regular matrix is executed by the processor to:

judge each superpixel $S_k$, if $S_k$ only comprises a sample belonging to a class c in the training sample set A, determining that, in a vector $^-14Et$, $u$, $=1$ and all the other elements are 0 and setting each column vector in $U_k$ to be equal to u, otherwise calculating an average value of $U_k$ for each row to obtain the vector u, dividing the vector u by the number of pixels in the superpixel and further setting each column vector in $U_k$ to be equal to u; and obtain the regular matrix U.

12. The non-transitory computer-readable storage medium of claim 9, wherein the computer program executed by the processor to determine the class that the sample belongs to according to the regular matrix is executed by the processor to:

fuse the regular matrix to a classification matrix; and determine a maximum value corresponding to each sample in the classification matrix as the class that the sample belongs to.

\* \* \* \* \*